T. W. BLADES.
Indicator.
No. 226,269. Patented April 6, 1880.
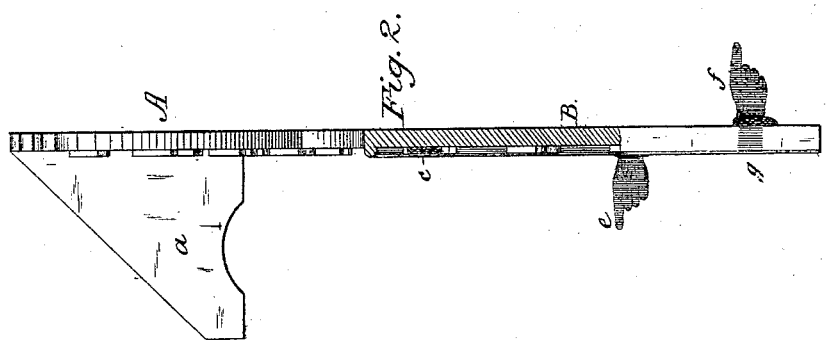
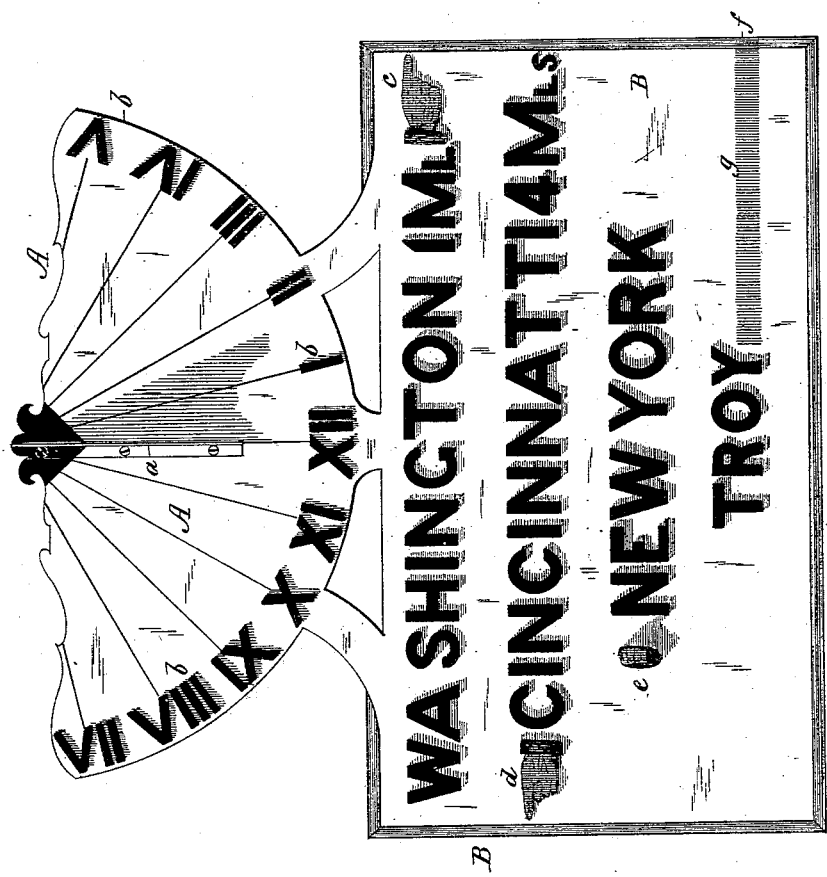
WITNESSES:
Sidney P. Hollingsworth
Amos W. Hart
INVENTOR:
T. W. Blades
BY
ATTORNEYS.

UNITED STATES PATENT OFFICE.

TRISTRAM W. BLADES, OF POINT PLEASANT, WEST VIRGINIA.

INDICATOR.

SPECIFICATION forming part of Letters Patent No. 226,269, dated April 6, 1880.

Application filed December 4, 1879.

*To all whom it may concern:*

Be it known that I, TRISTRAM WALKER BLADES, of Point Pleasant, in the county of Mason and State of West Virginia, have invented a new and Improved Indicator or Guide-Board; and I do hereby declare that the following is a full, clear, and exact description of the same.

My invention relates to an improvement in guide-boards or indicators; and it consists in a certain construction and arrangement of parts, as hereinafter described.

In practice I provide the guide-board with a sun-dial attachment and cast the whole in one piece.

In accompanying drawings, forming part of this specification, Figure 1 is a face view of a device embodying my invention, and Fig. 2 is an end view of the same.

The sun-dial plate A and guide-board plate B are cast together or in one piece, and are in the same plane.

The material of the casting is preferably iron, that being economical and durable.

The sun-dial A is a segmental plate, having the usual gnomon $a$ and a peripheral row of raised numbers, $b$.

The guide-board B is cast with raised letters to indicate the names of the several towns, cities, or other localities to which the traveler is to be directed. At the end, or near the end, of each name of a locality is a raised or projecting index-hand, which is also cast solid with the plate B. In the present instance the guide-board indicates the names of four cities, "Washington," "Cincinnati," "New York," and "Troy."

Suppose the guide-board to be properly placed at the intersection of two roads, then the index-hand $c$ at the right of the name "Washington" would indicate the road leading to or toward such place, while the index-hand $d$ at the left of the name "Cincinnati" similarly points out the road to the city of that name. These two index-hands $c$ $d$ indicate opposite directions on the same road, and the guide-board is hence to be placed parallel to the side of such road. In such position it will be at right angles to the direction of the other or cross road, which is supposed to lead to New York in one direction and to Troy in the other direction. The pointers or index-hands $ef$ for indicating these directions project from the board B at right angles to its plane. The pointer $e$, which is located beside the name "New York," projects forward from the face of said board, and the pointer $f$, which indicates the direction of Troy, projects from the rear side of the board B, being located at the end of the same and connected with the name "Troy" by means of a groove or black or colored line, $g$, as shown. Thus the guide-board is adapted to indicate not only the directions which are parallel to its plane, but also those which are at right angles to it.

What I claim is—

The guide-board bearing on its face the name of a locality, and having a pointer or index-hand projecting rearward from its rear side, and a groove which connects said pointer with the name of the locality the direction of which is indicated by the pointer, as shown and described.

TRISTRAM WALKER BLADES.

Witnesses:
JOSEPH HAYNES HOLLOWAY,
JOHN W. DEEM.